US008767242B2

(12) United States Patent
Kota

(10) Patent No.: US 8,767,242 B2
(45) Date of Patent: Jul. 1, 2014

(54) IMAGE PROCESSING APPARATUS, OUTPUT CONTROL SYSTEM, OUTPUT CONTROL METHOD

(75) Inventor: Noriko Kota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 133 days.

(21) Appl. No.: 13/367,483

(22) Filed: Feb. 7, 2012

(65) Prior Publication Data

US 2012/0218609 A1 Aug. 30, 2012

(30) Foreign Application Priority Data

Feb. 24, 2011 (JP) ................................. 2011-038085

(51) Int. Cl.
*H04N 1/40* (2006.01)

(52) U.S. Cl.
USPC ........................................ 358/1.15; 358/468

(58) Field of Classification Search
USPC ......... 358/1.9, 2.1, 1.15–1.17, 400, 402–407, 358/500, 468, 539
See application file for complete search history.

(56) References Cited

FOREIGN PATENT DOCUMENTS

| EP | 1 835 714 A1 | 9/2007 |
|----|--------------|--------|
| JP | 2010-146353  | 7/2010 |
| JP | 2010-152726  | 7/2010 |

OTHER PUBLICATIONS

Extended European Search Report issued Jul. 24, 2013 in Patent Application No. 12155126.1.

*Primary Examiner* — Thomas D Lee
*Assistant Examiner* — Stephen M Brinich
(74) *Attorney, Agent, or Firm* — Oblon, Spivak, McClelland, Maier & Neustadt, L.L.P.

(57) ABSTRACT

An apparatus stores accumulated jobs in a storage area, and outputs a shared job among the accumulated jobs that is set to be shared by plural users. The apparatus includes a job list display unit configured to display a job list generated based on job information of the accumulated jobs; and a job control unit configured to control output of an execution job selected from the job list. The job list display unit displays a shared job included in the job list that is determined as being allowed to be executed in the apparatus based on an allowance condition set when the shared job is set, and the job control unit outputs job data of a shared job selected as the execution job from the displayed job list, in an output format specified at the time of job execution.

12 Claims, 14 Drawing Sheets

■ SHARE DOCUMENT

SHARE LOCATION ADDRESS: UserB,UserC,UserD

SHARE LOCATION IP ADDRESS: 133.139.*.*

SHARE LOCATION COUNTRY (AREA): USA

SHARING PERIOD: 2010/12/15–2010/12/25

■ AUTOMATICALLY DELETE SHARED DOCUMENT
  ● DELETE WHEN ALL SHARING USERS HAVE EXECUTED THE JOB
  ○ DELETE WHEN SHARING PERIOD HAS PASSED

■ DO NOT DISPLAY SHARED DOCUMENT IN JOB LIST
  ○ DO NOT DISPLAY ACCORDING TO USER SELECTION
  ● DO NOT DISPLAY WHEN USER HAS EXECUTED JOB
    (AUTOMATICALLY DO NOT DISPLAY)

■ PROHIBIT COPYING SHARED DOCUMENT
  ● PROHIBIT COPYING ELECTRONIC DOCUMENT (COPY GUARD)
  ○ PROHIBIT COPYING PRINTED DOCUMENT (WATERMARK PRINTING)

| JOB | | | | SHARE | | | | | | | |
|---|---|---|---|---|---|---|---|---|---|---|---|
| JOB IDENTI- FICATION | USER IDENTI- FICATION | JOB ATTRIBUTE | STORAGE LOCATION | SHARE CONTROL SETTING | SHARE LOCATION ADDRESS | SHARE LOCATION IP ADDRESS | SHARE LOCATION COUNTRY | SHARING PERIOD | DELETE CONTROL SETTING | DISPLAY CONTROL SETTING | COPY PROHI- BITION SETTING |
| DOCUMENT A.doc | UserA | (ATTRIBUTE VALUE) | ¥¥Doc¥ UserA¥ … | NO | — | — | — | — | — | — | — |
| MINUTE .doc | UserA | (ATTRIBUTE VALUE) | ¥¥Doc¥ UserA¥ … | YES | groupA@ foo.co.jp, groupB@ foo.co.jp | 133.139. *.* | JAPAN, USA | 2010/ 08/15- 2010/ 08/31 | DELETE WHEN SHARING PERIOD HAS PASSED | USER SELECTION | COPY GUARD WATER- MARK PRINTING |
| SALES REPORT .pdf | UserA | (ATTRIBUTE VALUE) | ¥¥Doc¥ UserA¥ … | YES | UserB, C, D | 133.139 .*.* | USA | 2010/ 12/15- 2010/ 12/25 | DELETE WHEN ALL SHARING USERS HAVE EXECUTED THE JOB | AUTOMATIC NON- DISPLAY | COPY GUARD |
| ⋮ | ⋮ | ⋮ | ⋮ | ⋮ | ⋮ | ⋮ | ⋮ | ⋮ | ⋮ | ⋮ | ⋮ |

| USER IDENTIFICATION | OUTPUT FORMAT | |
|---|---|---|
| | ELECTRONIC TRANSFER | PRINT |
| UserA | ALLOWED | ALLOWED |
| UserB | ALLOWED | NOT ALLOWED |
| UserC | NOT ALLOWED | ALLOWED |
| ... | ... | ... |
| UserX | ALLOWED | NOT ALLOWED |

[SALES REPORT]

| USER IDENTIFICATION | JOB EXECUTION RECORD |
|---|---|
| UserA | OUTPUT |
| UserB | NOT OUTPUT |
| UserC | OUTPUT |
| UserD | NOT OUTPUT |

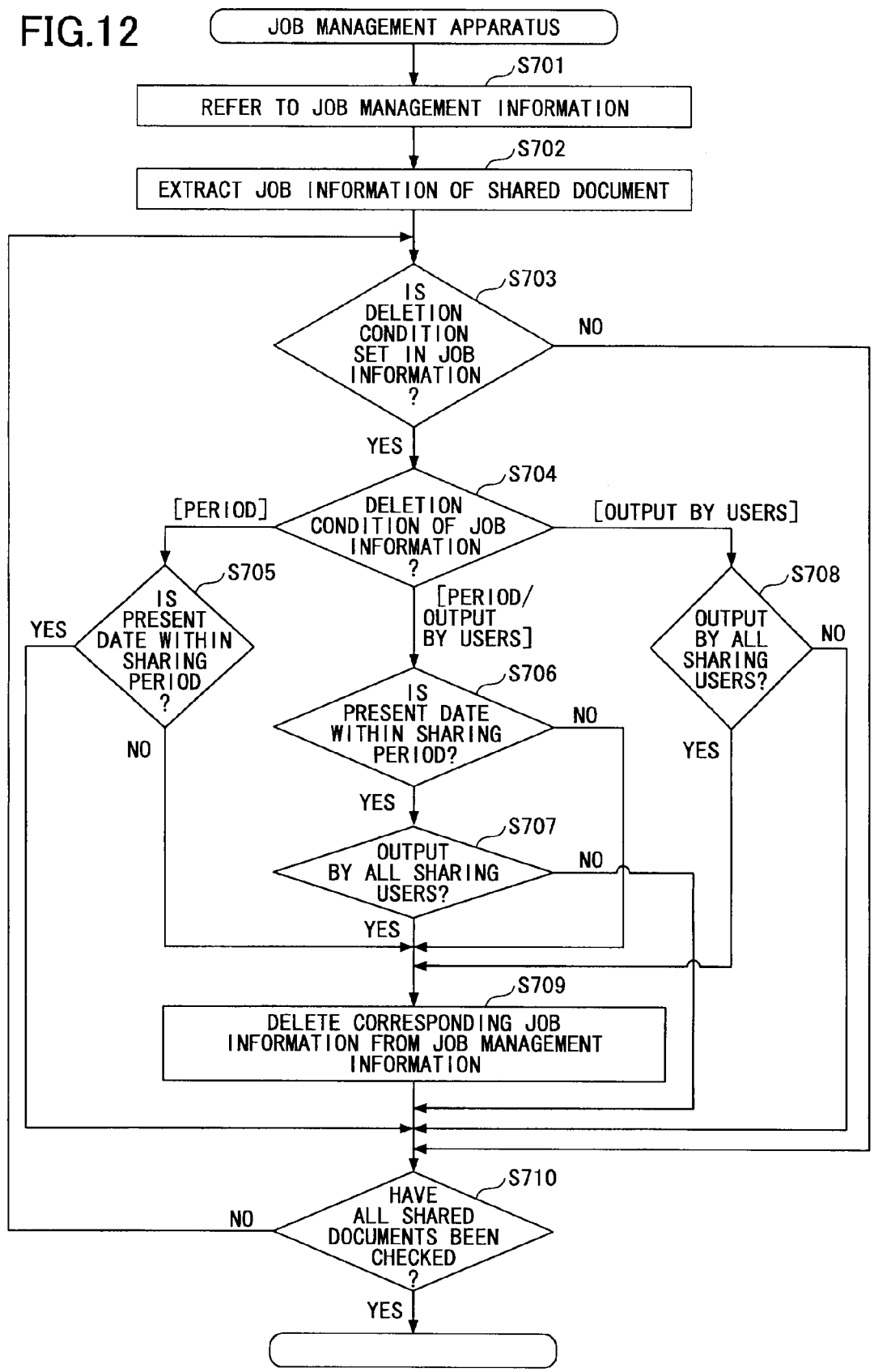

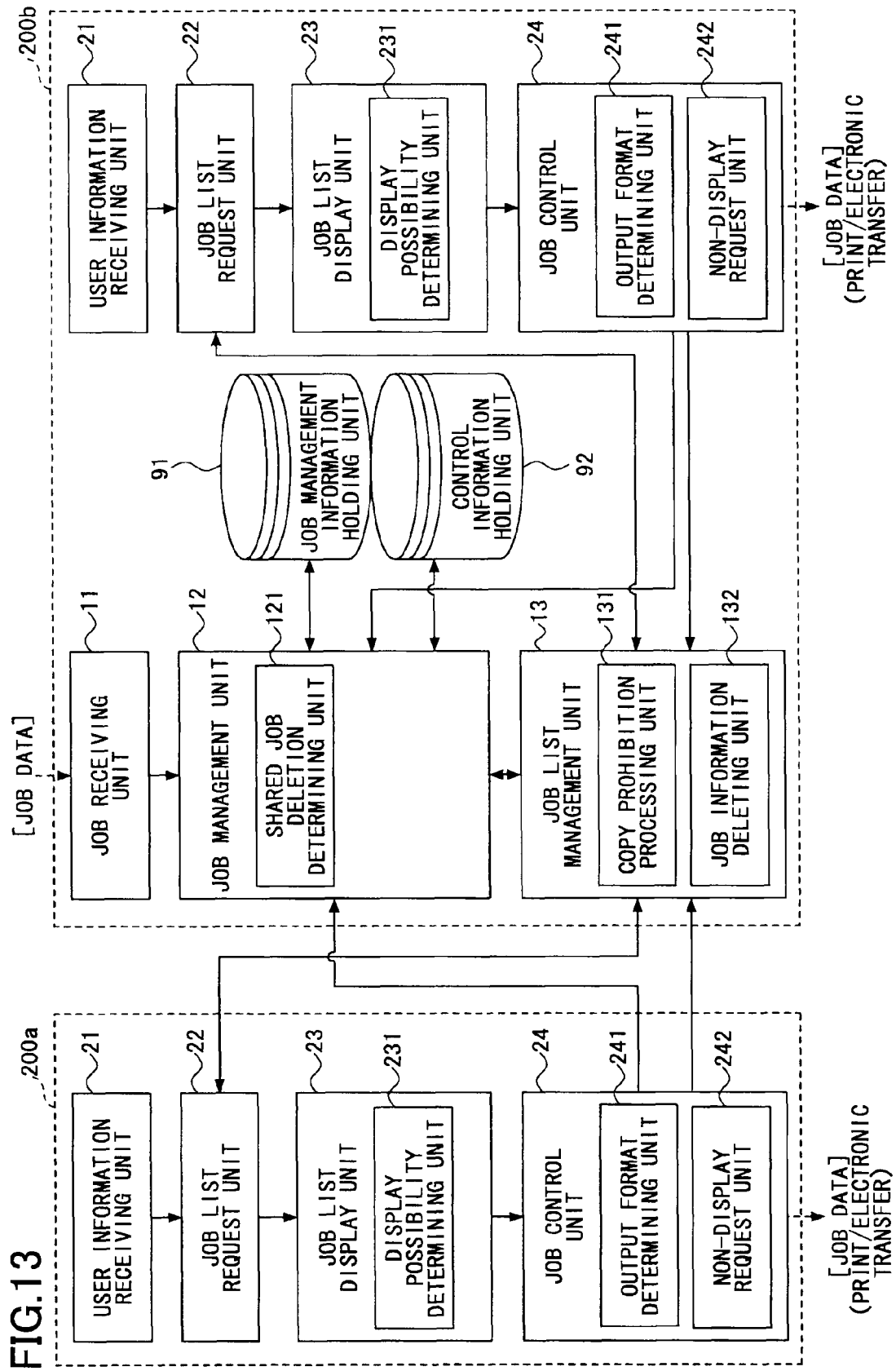

IMAGE PROCESSING APPARATUS, OUTPUT CONTROL SYSTEM, OUTPUT CONTROL METHOD

BACKGROUND OF THE INVENTION

1. Field of the Invention

The present invention relates to a technology for controlling output of a shared job.

2. Description of the Related Art

Conventionally, there is known a mechanism by which plural users share print jobs that are accumulated in a print server and centrally controlled. For example, patent document 1 discloses a system for making a share setting at the printer driver, and accumulating, in the print server, print jobs that are set to a share setting so that plural users can share the jobs.

However, in conventional methods, the operation of controlling the output of a shared job is not taken into consideration. In this case, output control refers to "data management of shared jobs" and "controlling execution of shared jobs".

In the conventional technology, the method of managing data of shared jobs is performed by displaying a job list of all of the set shared jobs to users of shared jobs. However, the method of managing data of shared jobs is preferably performed to display or not display shared jobs according to the job execution environment (for example, "the installation area of the image processing apparatus") of the users of shared jobs. This is an effective method for realizing high confidentiality of the shared information, even if the jobs are shared (for solving the security problem of shared jobs).

Furthermore, the method of executing shared jobs is preferably performed to electronically transfer the data by e-mail transmission, instead of printing out the data on paper. This is because electronic transfer is an effective method for flexibly providing information to user environments that have become versatile due to the prevalence of information terminals having high portability, and for realizing reduction of TCO (Total Cost of Ownership) performed as a corporate activity.

As described above, the conventional methods do not implement output control of shared jobs in consideration of confidentiality of shared information, flexible information providing in versatile user environments, and TCO reduction.

Patent Document 1: Japanese Laid-Open Patent Publication No. 2010-152726

SUMMARY OF THE INVENTION

The present invention provides an image processing apparatus, an output control system, and an output control method, in which one or more of the above-described disadvantages are eliminated.

A preferred embodiment of the present invention provides an image processing apparatus, an output control system, and an output control method with which output control of shared jobs can be performed.

According to an aspect of the present invention, there is provided an apparatus for storing accumulated jobs in a predetermined storage area, and outputting a shared job among the accumulated jobs that is set to be shared by plural users, the apparatus including a job list display unit configured to display a job list generated based on job information of the accumulated jobs; and a job control unit configured to control output of an execution job selected from the job list, wherein the job list display unit displays a shared job included in the job list that is determined as being allowed to be executed in the apparatus based on an allowance condition set when the shared job is set to be shared, and the job control unit outputs job data of a shared job selected as the execution job from the job list displayed by the job list display unit, the job data being output according to an output format specified at the time of job execution.

According to an aspect of the present invention, there is provided an output control system including a job management apparatus configured to store accumulated jobs in a predetermined storage area and manage the accumulated jobs; and an apparatus configured to output a shared job among the accumulated jobs that is set to be shared by plural users, wherein the job management apparatus and the apparatus are connected by a predetermined data transmission line, wherein the job management apparatus includes a job list management unit configured to manage a job list generated based on job information of the accumulated jobs, wherein the apparatus includes a job list display unit configured to display the job list, and a job control unit configured to control output of an execution job selected from the job list, wherein the job management apparatus sends, to the apparatus making an acquisition request, the job list managed by the job list management unit and job data of the accumulated jobs included in the job list, in response to the acquisition request from the apparatus, and the apparatus displays, by the job list display unit, a shared job that is included in the job list received from the job management apparatus and that is determined as being allowed to be executed in the apparatus based on an allowance condition set when the shared job is set to be shared, and the apparatus outputs, by the job control unit, job data of a shared job selected as the execution job from the displayed job list among the job data received from the job management apparatus, the job data being output according to an output format specified at the time of job execution.

According to an aspect of the present invention, there is provided an output control method performed by an apparatus for storing accumulated jobs in a predetermined storage area, and outputting a shared job among the accumulated jobs that is set to be shared by plural users, the output control method including the steps of displaying, on a display device, a job list generated based on job information of the accumulated jobs; and controlling output of an execution job selected from the job list via the display device, wherein the displaying includes displaying a shared job included in the job list that is determined as being allowed to be executed in the apparatus based on an allowance condition set when the shared job is set to be shared, and the controlling includes outputting job data of a shared job selected as the execution job from the displayed job list, the job data being output according to an output format specified at the time of job execution.

BRIEF DESCRIPTION OF THE DRAWINGS

Other objects, features and advantages of the present invention will become more apparent from the following detailed description when read in conjunction with the accompanying drawings, in which:

FIGS. 5A and 5B illustrate examples of share setting screen images of jobs according to an embodiment of the present invention;

FIG. 6 indicates a data example of job management information according to an embodiment of the present invention;

FIGS. 7A and 7B illustrate data examples of control information according to an embodiment of the present invention;

FIG. 12 is a flowchart indicating processing procedures of shared job deletion according to an embodiment of the present invention; and FIG. 13 illustrates a functional configuration example of output control according to a modification of the present invention.

DETAILED DESCRIPTION OF THE PREFERRED EMBODIMENTS

A description is given, with reference to the accompanying drawings, of embodiments of the present invention.

System Configuration

Figure 1:
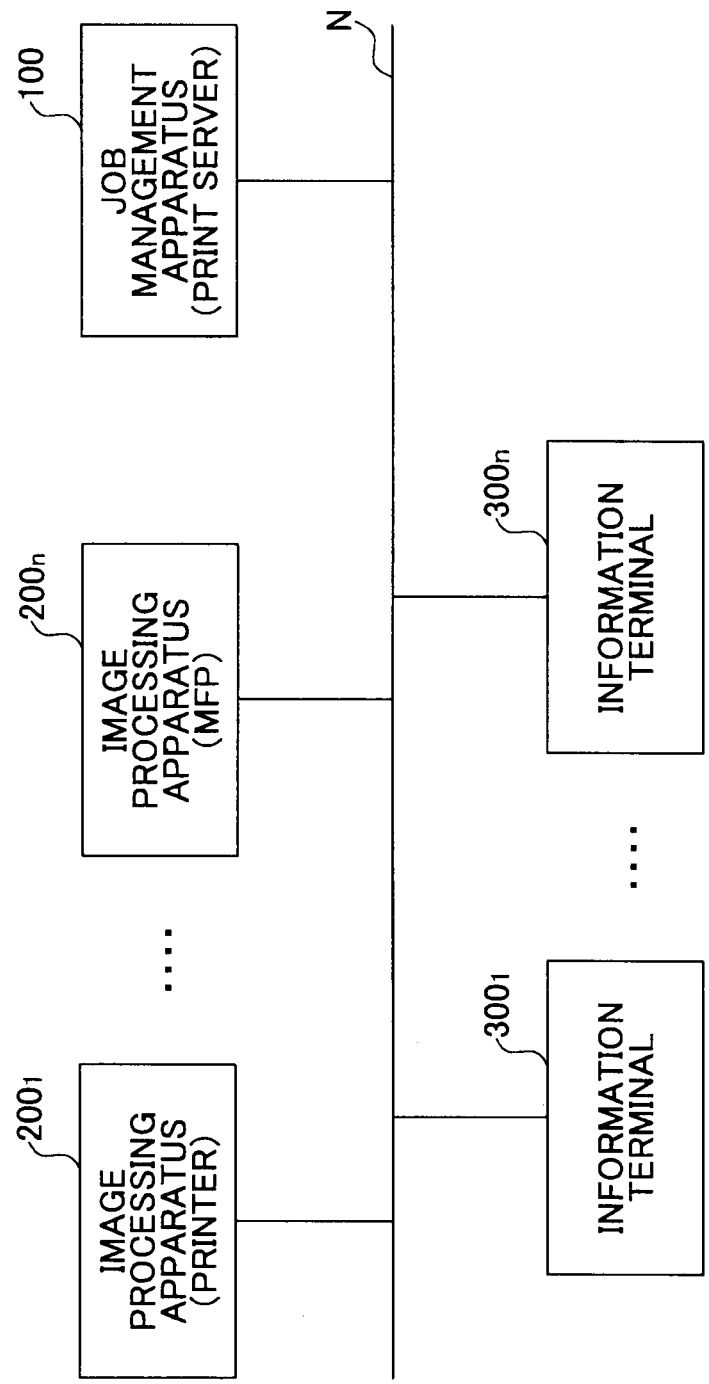
FIG. 1 illustrates a configuration example of an output control system according to an embodiment of the present invention.

FIG. 1 illustrates a configuration example of an output control system 1 according to an embodiment.

FIG. 1 indicates a system configuration example in which plural information terminals $300_1$ through $300_n$ (hereinafter, also collectively referred to as an information terminal 300), plural image processing apparatuses $200_1$ through $200_n$ (hereinafter, also collectively referred to as an image processing apparatus 200), and a job management apparatus 100 are connected to each other by a data transmission line N such as a network (for example, LAN: Local Area Network).

The information terminal 300 is a device having a job transmission function. The information terminal 300 is, for example, a PC (Personal Computer) and a PDA (Personal Digital Assistant). The information terminal 300 transmits, to the job management apparatus 100, job data that has undergone execution by various settings via applications such as a printer driver and a Web browser.

The image processing apparatus 200 is a device having an image processing function. The image processing apparatus 200 is, for example, a LP (Laser Printer) and a MFP (Multifunction Peripheral). In the case of a MFP, the installed image processing functions are, for example, a copy function, a scan function, and a print function.

The job management apparatus 100 is a device having a job management function. The job management apparatus 100 is, for example, a PC. The job management apparatus 100 stores/accumulates data received from the information terminal 300 in a predetermined storage area, manages job data based on job management information, and sends a job list and job data of the user to the image processing apparatus 200. When the received data is print data, the job management apparatus 100 corresponds to a print server.

The output control system 1 provides services as follows. For example, the user sends, from the information terminal 300, job data in which a sharing user (another user with which the information is to be shared) is set, and the shared job data is accumulated in the job management apparatus 100. Thus, the sharing user can acquire a job list of the user including shared jobs, by inputting user information (for example, a user ID) in the image processing apparatus 200. Accordingly, as the sharing user selects a shared job that the user desires to execute from the job list, the data of the selected shared job is output.

As described above, the output control system 1 according to the present embodiment has a system configuration by which an output control service of shared jobs can be provided.

Hardware Configuration

Job Management Apparatus

Figure 2:
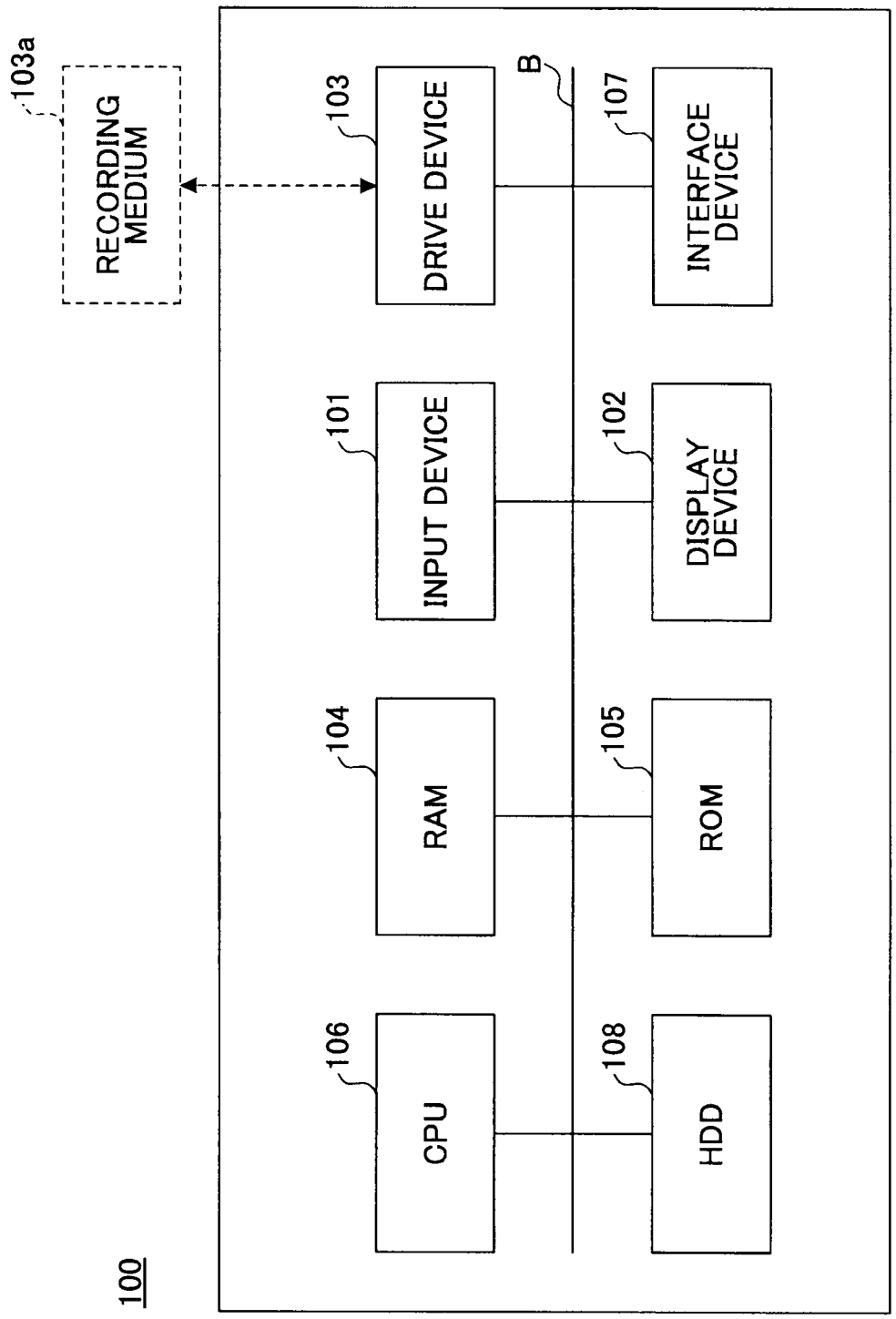
FIG. 2 illustrates a hardware configuration of a job management apparatus according to an embodiment of the present invention.

FIG. 2 illustrates a hardware configuration of the job management apparatus 100 according to the present embodiment. The information terminal 300 is the same information processing apparatus as the job management apparatus 100, and therefore the hardware configuration of the information terminal 300 is not further described.

As shown in FIG. 2, the job management apparatus 100 includes an input device 101, a display device 102, a drive device 103, a RAM (Random Access Memory) 104, a ROM (Read-Only Memory) 105, a CPU (Central Processing Unit) 106, an interface device 107, and a HDD (Hard Disk Drive) 108, which are interconnected by a bus B.

The input device 101 includes a keyboard and a mouse, and is used for inputting various operation signals to the job management apparatus 100. The display device 102 includes a display for displaying processing results obtained by the job management apparatus 100.

The interface device 107 is an interface for connecting the job management apparatus 100 to the network N. Accordingly, the job management apparatus 100 can perform data communications with the information terminals 300 and the image processing apparatuses 200 via the interface device 107.

The HDD 108 is a nonvolatile storage device storing programs and data. The programs and data that are stored include an information processing system for controlling the overall device (for example, an OS (Operating System) that is the basic software such as Windows (trademark or registered trademark) and UNIX (trademark or registered trademark)), and applications for providing various functions (for example, an output control function) in the system. The HDD 108 manages programs and data stored therein by a predetermined file system and/or a DB (database). The received data (job data) from the information terminal 300 is stored/accumulated in a predetermined storage area in the HDD 108, and is managed by the DB.

The drive device 103 is an interface between the job management apparatus 100 and a detachable recording medium 103a. Accordingly, the job management apparatus 100 can read/write from the recording medium 103a via the drive device 103. The recording medium 103a may be, for example, a floppy (trademark or registered trademark) disk, a CD (Compact Disk), a DVD (Digital Versatile Disk), a SD memory card, and a USB memory (Universal Serial Bus memory).

The ROM 105 is a nonvolatile semiconductor memory (storage device) that can store internal data even after the power is turned off. The ROM 105 stores programs and data such as BIOS (Basic Input/Output System) that is executed when the job management apparatus 100 is activated, information processing system settings, and network settings. The RAM 104 is a volatile memory (storage device) that temporarily stores programs and data. The CPU 106 is a processor that controls the overall device and implements the installed functions by loading programs and data from the above storage devices (e.g., the HDD and ROM) into the RAM (memory).

As described above, the job management apparatus 100 according to the present embodiment can provide the job management service by the above hardware configuration.

Image Processing Apparatus

Figure 3:
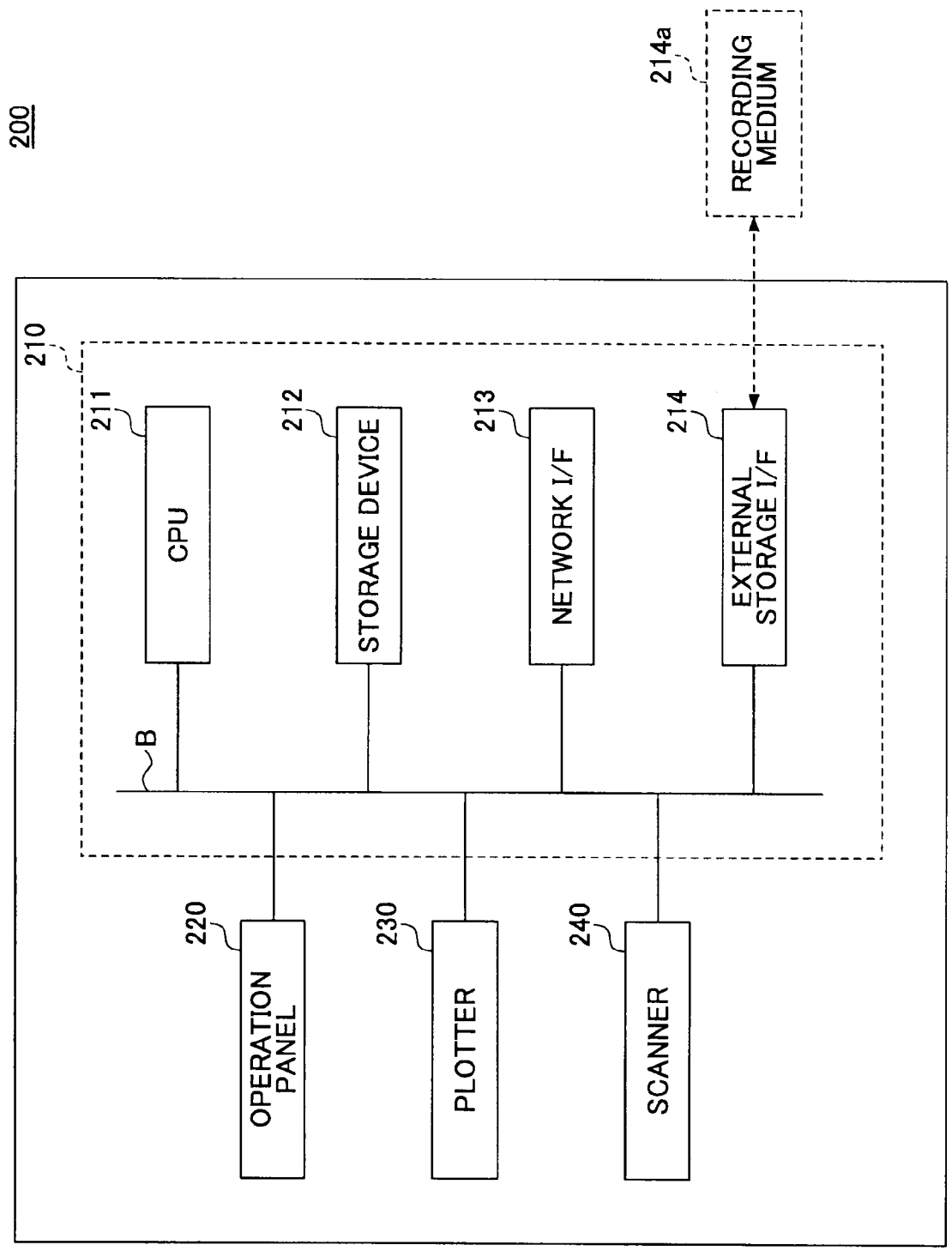
FIG. 3 illustrates a hardware configuration of an image processing apparatus according to an embodiment of the present invention.

FIG. 3 illustrates a hardware configuration of the image processing apparatus 200 according to the present embodiment.

As shown in FIG. 3, the image processing apparatus 200 includes a controller 210, an operation panel 220, a plotter 230, and a scanner 240, which are interconnected by a bus B.

The operation panel 220 includes a display unit and an input unit, and provides various kinds of information such as device information to the user, and receives various user operations such as operation settings and operation instructions. The job list acquired from the job management apparatus 100 is displayed on the display unit of the operation panel 220. The operation panel 220 receives job execution instructions from the user that are input with an input unit such as a predetermined GUI (Graphical User Interface).

The plotter 230 includes an image forming unit for forming output images on sheets. Methods of forming output images include an electrophotographic process and an inkjet method. The scanner 240 optically scans an original and generates a scanned image.

The controller 210 includes a CPU 211, a storage device 212, a network I/F 213, and an external storage I/F 214, which are interconnected by a bus B.

The CPU 211 controls the entire device by executing programs. The storage device 212 stores and holds the above programs and various kinds of data (for example, image data). The storage device 212 may be, for example, a RAM that is a volatile memory, a ROM that is a nonvolatile memory, and a HDD having a large capacity storage area. The RAM functions as a work area (a storage area into which programs and data are temporarily loaded) of the CPU 211. The ROM and the HDD are used for storing programs and various kinds of data. Accordingly, in the image processing apparatus 200, the CPU 211 loads the programs stored in the ROM into the RAM (memory), and executes the programs.

The network I/F 213 is an interface for connecting the image processing apparatus 200 to a predetermined data transmission line N such as a network. The external storage I/F 214 is an interface for connecting the image processing apparatus 200 to a recording medium 214a which is an external storage device. The recording medium 214a may be, for example, an SD memory card and a USB memory. Accordingly, the image processing apparatus 200 reads programs and data stored in the recording medium 214a via the external storage I/F 214.

As described above, the image processing apparatus 200 according to the present embodiment can provide image processing services by the above hardware configuration.

Output Control Function

A description is given of an output control function according to the present embodiment.

The image processing apparatus 200 according to the present embodiment acquires a job list generated based on information relevant to accumulated jobs including shared jobs that are set to be shared by plural users, and job data of jobs included in the job list. The image processing apparatus 200 displays shared jobs that are determined as being allowed to be executed in the present device among the shared jobs included in the acquired job list, based on allowance conditions set when making the job share setting (when setting the job to be shared by plural users). The image processing apparatus 200 outputs (prints/electronically transfers) the job data of the shared job selected as the job to be executed from the displayed job list, according to an output format specified at the time of job execution. The image processing apparatus 200 according to the present embodiment has the above described output control function.

Conventional methods do not implement output control of shared jobs in consideration of confidentiality of shared information, flexible information providing in versatile user environments, and TCO reduction.

Therefore, the image processing apparatus 200 according to the present embodiment has the following mechanism. Specifically, the image processing apparatus 200 restricts displaying shared jobs in the job list from which the job to be executed is selected, according to allowance conditions set when making the job share setting. Furthermore, the job data of the shared job for which an execution instruction is given is output in an output format specified at the time of job execution.

Accordingly, the image processing apparatus 200 according to the present embodiment can implement output control of shared jobs in consideration of confidentiality of shared information, flexible information providing in versatile user environments, and TCO reduction.

In the following, a description is given of the configuration and the operation of the output control function according to the present embodiment.

Figure 4:
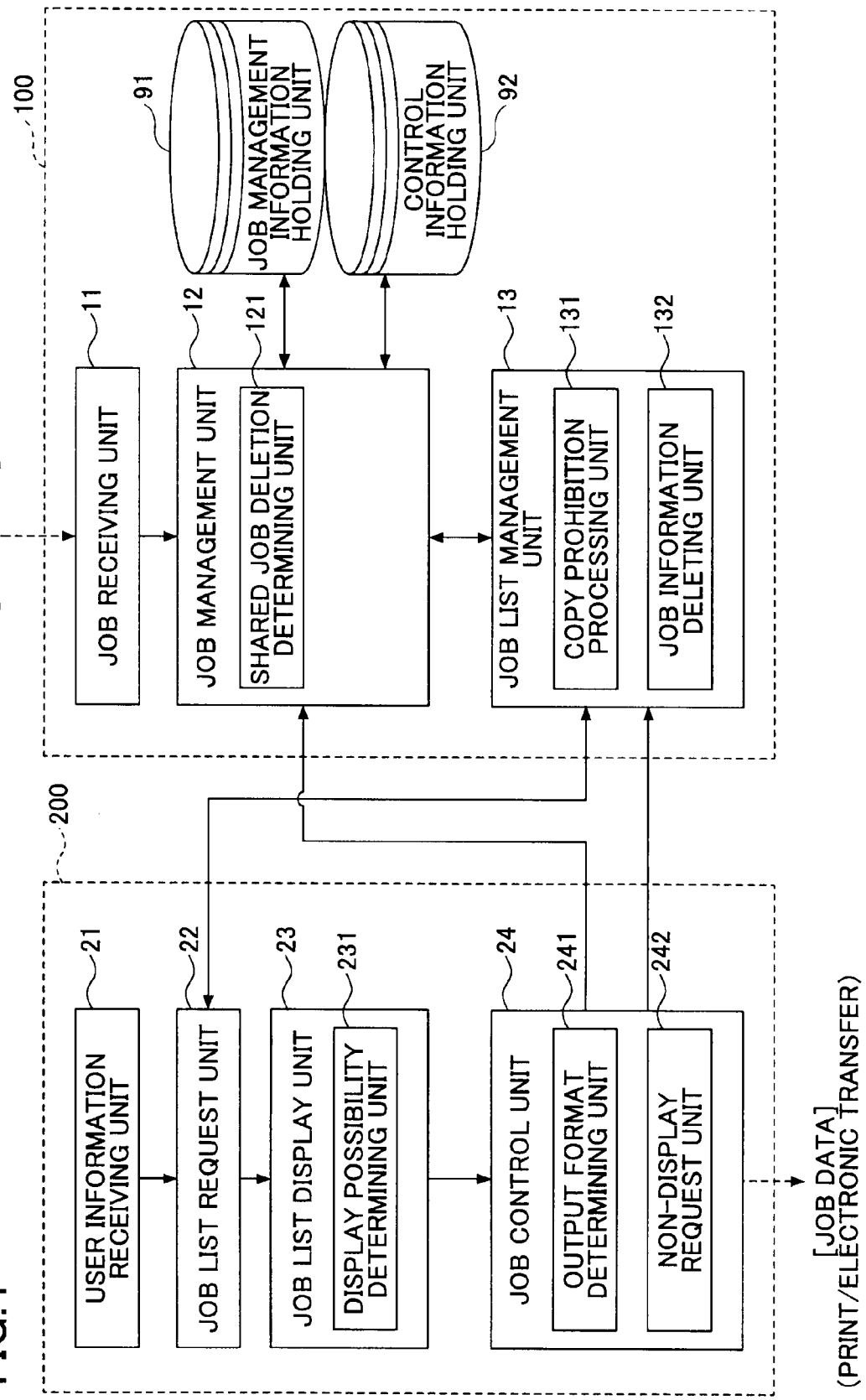
FIG. 4 illustrates the configuration of an output control function according to an embodiment of the present invention.

FIG. 4 illustrates the configuration of the output control function according to the present embodiment.

As shown in FIG. 4, the output control function according to the present embodiment includes a user information receiving unit 21, a job list request unit 22, a job list display unit 23, and a job control unit 24. These units are functions of the image processing apparatus 200. Meanwhile, the job management apparatus 100 includes a job receiving unit 11, a job management unit 12, and a job list management unit 13. The output control function operates in cooperation with these functional units of the job management apparatus 100.

Job Management Apparatus

The job receiving unit 11 is a functional unit that receives job data sent from the information terminal 300.

A description is given of a method of making a share setting of job data that the job receiving unit 11 receives.

Figure 5A:
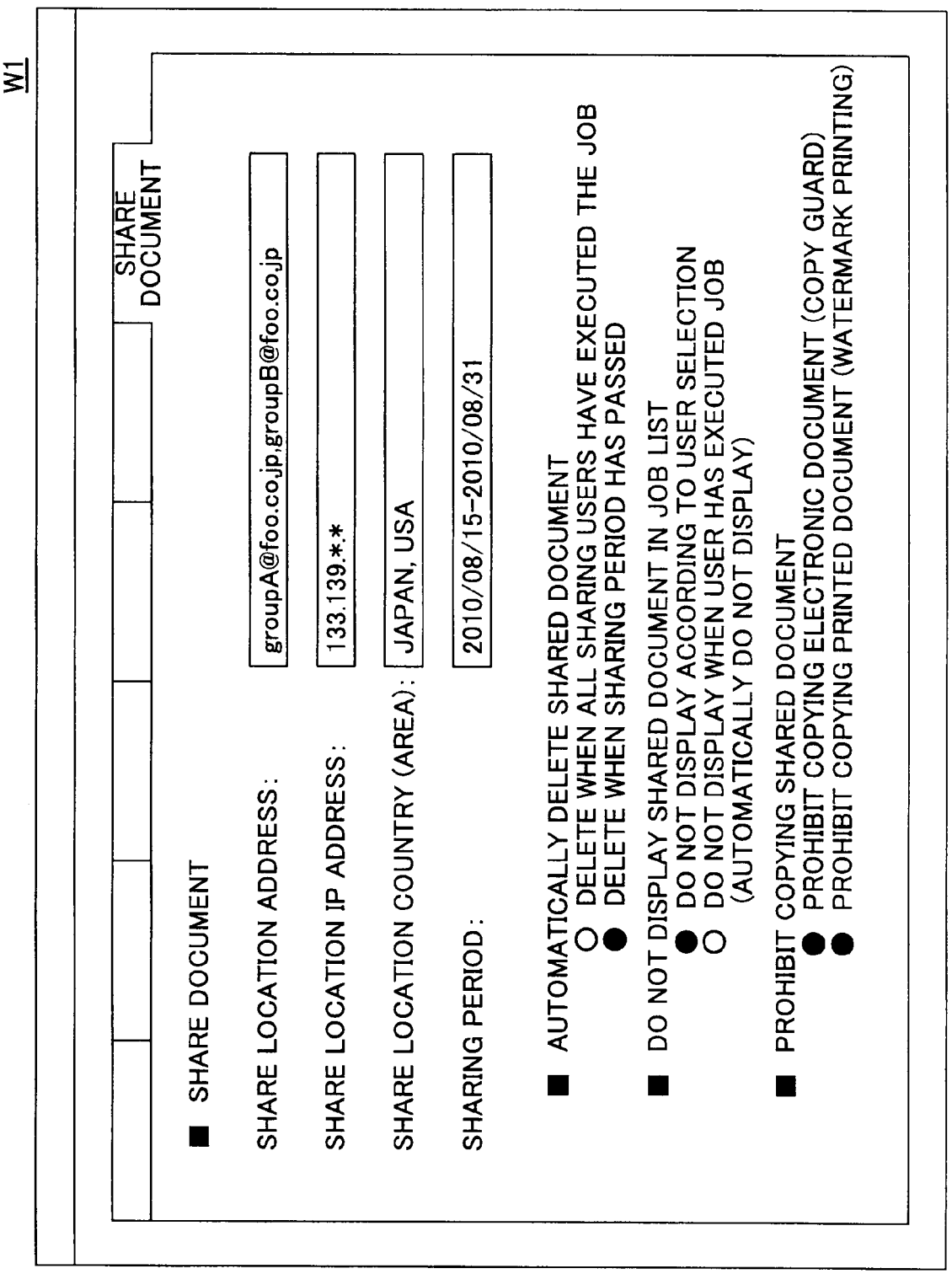

FIGS. 5A and 5B illustrate examples of share setting screen images of jobs according to the present embodiment.

FIG. 5A indicates a share setting screen image W1 displayed by a printer driver, and FIG. 5B indicates a share setting screen image W2 displayed by a Web browser.

In the share setting screen images W1 and W2 (hereinafter, also collectively referred to as a "share setting screen image W"), the following items can be set.

First, an item for controlling whether to share a document (job data) can be set (hereinafter, "share control item"). When the share control item is set, the following detailed items can be set.

Detailed items include a share location address in which a sharing user and an attribute (for example, the "department") of the sharing user can be input and specified by a user ID and an e-mail address; a share location IP address in which the allowed execution environment (image processing apparatus) of the shared job can be input and specified by an IP (Internet Protocol) address; a share location country in which the allowed execution area (destination) of the shared job can be input and specified by a country name; and a sharing period in which the expiration date of the shared job can be input and specified by a date.

Furthermore, when a share control item is set, it is possible to set an item for controlling whether to automatically delete a shared document (shared job data) (hereinafter, "delete control item"). When the delete control item is set, it is possible to set detailed items relevant to delete conditions that can be selected/specified, such as "delete when all sharing users have executed the job" and "delete when sharing period has passed".

Furthermore, when a share control item is set, it is possible to set an item for controlling whether to display the shared document in the job list (hereinafter, "display control item"). When the display control item is set, it is possible to set detailed items relevant to display conditions that can be selected/specified, such as "do not display according to user selection" and "do not display when user has executed job".

Furthermore, when a share control item is set, it is possible to set an item for controlling whether to prohibit copying the shared document (hereinafter, "copy prevention control item"). When the copy prevention control item is set, it is possible to set detailed items relevant to copy prohibition processes that can be selected/specified, such as "prohibit copying electronic document" and "prohibit copying printed document".

As described above, various share settings of job data can be set via predetermined applications included in the information terminal 300. For example, in the case of a printer driver, the setting value of the shared setting is attached to PDL data (Page Description Language data) as PJL data (Printer Job Language data), and is sent to the job management apparatus 100 as job data. Furthermore, in the case of a Web browser, the setting value of the share setting is sent to the job management apparatus 100 as a parameter of a HTTP (HyperText Transfer Protocol) request message.

Returning back to FIG. 4, the job receiving unit 11 analyzes the received data from the information terminal 300 (for example, the "PJL data" and the "parameter of a request message"), and acquires, in addition to job data, information relevant to the job (hereinafter, "job related information") and a setting value of a share setting (hereinafter, "share setting information").

The job management unit 12 is a functional unit that operates data in response to a request and manages jobs. For example, when a request to accumulate job data is requested by the job receiving unit 11, the job management unit 12 accesses a job management information holding unit 91, and stores the job data. That is to say, the data operations performed by the job management unit 12 include storing job data. Accordingly, a job requested by the information terminal 300 is accumulated in the job management apparatus 100 (accumulated job).

Furthermore, the job management unit 12 manages stored job data based on job management information held by the job management information holding unit 91. The job management information holding unit 91 is a predetermined storage area in a storage device provided in the job management apparatus 100.

A description is given of job management information.

FIG. 6 indicates a data example of job management information 91D according to the present embodiment.

As shown in FIG. 6, the job management information 91D includes a data set (hereinafter, "job information") in which information items of "job" and "share" are associated to each other in units of jobs.

The "job" items are relevant to job related information. Detailed items include "job identification", "user identification", "job attribute", and "storage location". As the item values, values of job related information acquired by the job receiving unit 11 are stored.

The "job identification" item is information for identifying jobs (hereinafter, "job identifier"), and the item value is a job data name or a job data ID. The "user identification" item is information for identifying users (hereinafter, "user identifier"), and the item value is a user name or a user ID. The "job attribute" item is information indicating attributes of jobs (hereinafter, "job attribute information"), and the item values are for specifying the number of copies, color/monochrome printing, double-sided printing, aggregate printing, etc. The "storage location" item is information indicating the storage location of job data (hereinafter, "storage location information"), and the item value is a URI (Uniform Resource Identifier) of the job data.

The "share" items are relevant to share setting information. Detailed items include "share control setting", "share location address", "share location IP address", "share location country", "sharing period", "delete control setting", "display control setting", and "copy prohibition setting". As the item values, values of share setting information acquired by the job receiving unit 11 are stored.

The "share control setting" item is information indicating the share control setting (hereinafter, "share control setting information"), and the item value is a setting value indicating whether to share a job. The "share location address" item is information indicating a share location address (hereinafter, "share location address information"), and the item value is an identifier indicating a sharing user or an attribute of the sharing user (for example, "department"). The "share location IP address" item is information indicating a share location IP address (hereinafter, "share location IP address information"), and the item value expresses the network setting range indicating the allowed execution environment of the shared job. The "share location country" item is information indicating a share location country (hereinafter, "share location country information"), and the item value expresses the area setting range indicating the allowed execution environment of the shared job. The "sharing period" item is information indicating a sharing period (hereinafter, "sharing period information"), and the item value expresses the date indicating the expiration date of the shared job. The "delete control setting" item is information indicating a delete control setting (hereinafter, "delete control setting information"), and the item value is a setting value of a delete condition. The "display control setting" item is information indicating a display control setting (hereinafter, "display control setting information"), and the item value is a setting value of a display condition. The "copy prohibition setting" item is information indicating a copy prohibition setting (hereinafter, "copy prohibition setting information"), and the item value is a setting value of a copy prohibition process.

The item values in the job management information 91D are updated by the job management unit 12. The job management unit 12 updates the job management information 91D by adding information acquired by the job receiving unit 11 ("job related information" and "share setting information") in association with job data that has been acquired by the job receiving unit 11 and stored in the job management information 91D. The added information corresponds to job information, and is managed in units of jobs. That is to say, the data operations performed by the job management unit 12 include updating the job management information 91D.

Referring back to FIG. 4, when a request to acquire job information and job data corresponding to a user is received from the job list management unit 13, the job management unit 12 refers to the job management information 91D and identifies the requested job information based on a user identifier, acquires the requested job data based on the storage location information included in the identified job information, and returns these information items to the request source. That is to say, the data operations performed by the job management unit 12 include acquiring job data and job information.

The job management unit 12 manages the stored job data based on the control information held by a control information holding unit 92. The control information holding unit 92 is a predetermined storage area in a storage device provided in the job management apparatus 100.

A description is given of control information.

FIGS. 7A and 7B illustrate data examples of control information 92D according to the present embodiment.

FIG. 7A illustrates a data example of control information $92D_1$ in which allowed output formats for users are set, and FIG. 7B illustrates a data example of control information $92D_2$ in which job execution records of users are recorded.

The control information $92D_1$ includes a data set (hereinafter, "output format setting information") in which information items of "user identification" and "output format" are associated to each other in units of users.

The "user identification" item is for setting user identifiers. The "output format" item is for setting the allowed output format when outputting job data. The item value indicates whether electronic transferring and printing, which are set as the output formats, are allowed/not allowed.

The item values of the control information $92D_2$ are set by the job management unit 12. The job management unit 12 provides a setting screen page (not shown) to the administrator. Accordingly, the job management unit 12 sets the value received via the setting screen page in the control information $92D_1$ in association with the user identifier. The information that is set in this manner corresponds to output format setting information, and is managed in units of users.

The control information $92D_2$ includes a data set (hereinafter, "job information") in which information items of "user identification" and "job execution records" are associated to each other in units of users. The control information $92D_2$ is associated with the job information of shared jobs managed by the job management information 91D. That is to say, the control information $92D_2$ is information that is associated with the shared jobs, among the accumulated jobs.

The "user identification" item is for recording user identifiers of sharing users. The "job execution record" item is for recording the execution status of a shared job, and the item value is a record value indicating whether shared job data has been output.

The item values of the control information $92D_2$ are recorded by the job management unit 12. The job management unit 12 receives, from the image processing apparatus 200 (job control unit), the output results of shared job data of each of the sharing users. Accordingly, the job management unit 12 records the received user identifier and output results in the control information $92D_2$. The information that is set in this manner corresponds to job execution record information, and is managed in units of users. That is to say, the data operations performed by the job management unit 12 include updating (setting/recording) the control information $92D_1$, $92D_2$ (hereinafter, also collectively referred to as "control information 92D").

Referring back to FIG. 4, when a request to acquire job information and job data corresponding to a user is received from the job list management unit 13, the job management unit 12 refers to the control information $92D_1$, identifies the output format setting information based on the user identifier, and returns the identified output format setting information to the request source, together with the job information and job data. That is to say, the data operations performed by the job management unit 12 include acquiring the output format setting information.

The job management unit 12 includes a shared job deletion determining unit 121 for determining whether to delete shared job data. At predetermined timings, the shared job deletion determining unit 121 refers to the job management information 91D, and performs deletion determination (determines whether to delete shared job data) according to deletion conditions set in the deletion control setting information included in job information of shared jobs. The predetermined timings are execution dates (schedule) and predetermined time intervals set in advance for performing deletion determination.

When "delete when sharing period passes" is set as a deletion condition, the shared job deletion determining unit 121 refers to the sharing period information included in job information of the shared job, determines whether the present date is within the sharing period, and performs deletion determination based on the determination result. The shared job deletion determining unit 121 determines to delete shared job data when it is determined that the sharing period has passed.

Furthermore, when "delete after being output by all sharing users" is set as a deletion condition, the shared job deletion determining unit 121 refers to the share location address information of the shared job, and identifies the sharing users based on user identifiers. Next, the shared job deletion determining unit 121 identifies the control information $92D_2$ based on the job identifier of the shared job. Accordingly, the shared job deletion determining unit 121 refers to the control information $92D_2$, determines whether all sharing users have output the shared job data based on the job execution record information of the identified sharing users, and performs deletion determination based on the determination results. The shared job deletion determining unit 121 determines to delete the shared job data when it is determined that all sharing users have executed the job.

The job management unit 12 identifies the shared job data based on the storage location information of the shared job, and deletes the identified shared job data based on determination results of the shared job deletion determining unit 121. The job management unit 12 deletes the control information $92D_2$ together with the shared job data. That is to say, the data operations performed by the job management unit 12 include deleting the job data and the control information $92D_2$.

As described above, in the present embodiment, the owner user (the user who accumulated the shared job in the job management apparatus 100) does not manually delete the shared job data after execution of the shared job. Instead, the shared job data is automatically deleted. Accordingly, it is possible to prevent information leakage and information falsification, and confidentiality of shared information can be secured.

The job list management unit 13 is a functional unit that manages job lists of users by performing data operations in response to requests. When a request to acquire a job list is received from the image processing apparatus 200 (job list request unit), the job list management unit 13 requests the job management unit 12 to acquire job information and job data corresponding to the user, and generates a job list based on the returned job information. The job list management unit 13 passes, to the job management unit 12, information relevant to the user (hereinafter, "user information") received from the image processing apparatus 200 (job list request unit), and requests to acquire job information and job data. That is to say, the data operations performed by the job list management unit 13 include generation of a job list.

Furthermore, the job list management unit 13 includes a copy prohibition processing unit 131 for performing a copy prohibition process on the shared job data among the returned job data. The copy prohibition processing unit 131 refers to copy prohibition setting information included in the job information of the returned shared job, and performs a process according to the set copy prohibition setting. A copy prohibition process includes adding a copy guard program or data and embedding electronic watermark data.

When "copy guard" is set as the copy prohibition setting, the copy prohibition processing unit 131 performs a process of adding a program or data for copy guard to the returned shared job data.

When "watermark printing" is set as the copy prohibition setting, the copy prohibition processing unit 131 performs a process of embedding electronic watermark data in the returned shared job data. When both "copy guard" and "watermark printing" are set as the copy prohibition setting, the copy prohibition processing unit 131 performs both copy prohibition processes. That is to say, the data operations performed by the job list management unit 13 include processing the job data.

The job list management unit 13 sends, to the image processing apparatus 200 (job list request unit), the generated job list, the returned output format setting information, and job data (including shared job data that has undergone the copy prohibition process), and responds to the acquisition request.

Furthermore, when a request to not display job information of a shared job is received from the image processing apparatus 200 (job control unit), the job list management unit 13 deletes, from the generated job list, the job information of the shared job that is not to be displayed. Thus, the job list management unit 13 includes a job information deleting unit 132 for deleting job information from the job list. The job information deleting unit 132 refers to the job list, and identifies job information corresponding to job information received from the image processing apparatus 200 (job control unit). Accordingly, the job information deleting unit 132 deletes the identified job information from the job list. That is to say, the data operations performed by the job list management unit 13 include updating the job list.

Image Processing Apparatus

The user information receiving unit 21 is a functional unit that receives user information at the time of log in. The user information receiving unit 21 receives a user identifier and authentication information input via the operation panel 220 at the time of log in. The user information receiving unit 21 may receive user information that is read, from a recording medium IC card (Integrated Circuit card) held by the user, by a recording medium reading device (not shown) connected via the external storage I/F 214.

The job list request unit 22 is a functional unit that sends a request to acquire a job list from a user to the job management apparatus 100 (job list management unit). The job list request unit 22 sends, to the job management apparatus 100, user information ("user identifier" and "authentication information") received by the user information receiving unit 21, and requests a job list. As a result, the job management apparatus 100 (job list management unit) sends, to the job list request unit 22, the job list, output format setting information, and job data of the user.

The job list display unit 23 is a functional unit that displays job lists. The job list display unit 23 displays a job list received by the job list request unit 22 on the display unit of the operation panel 220.

Figure 8:
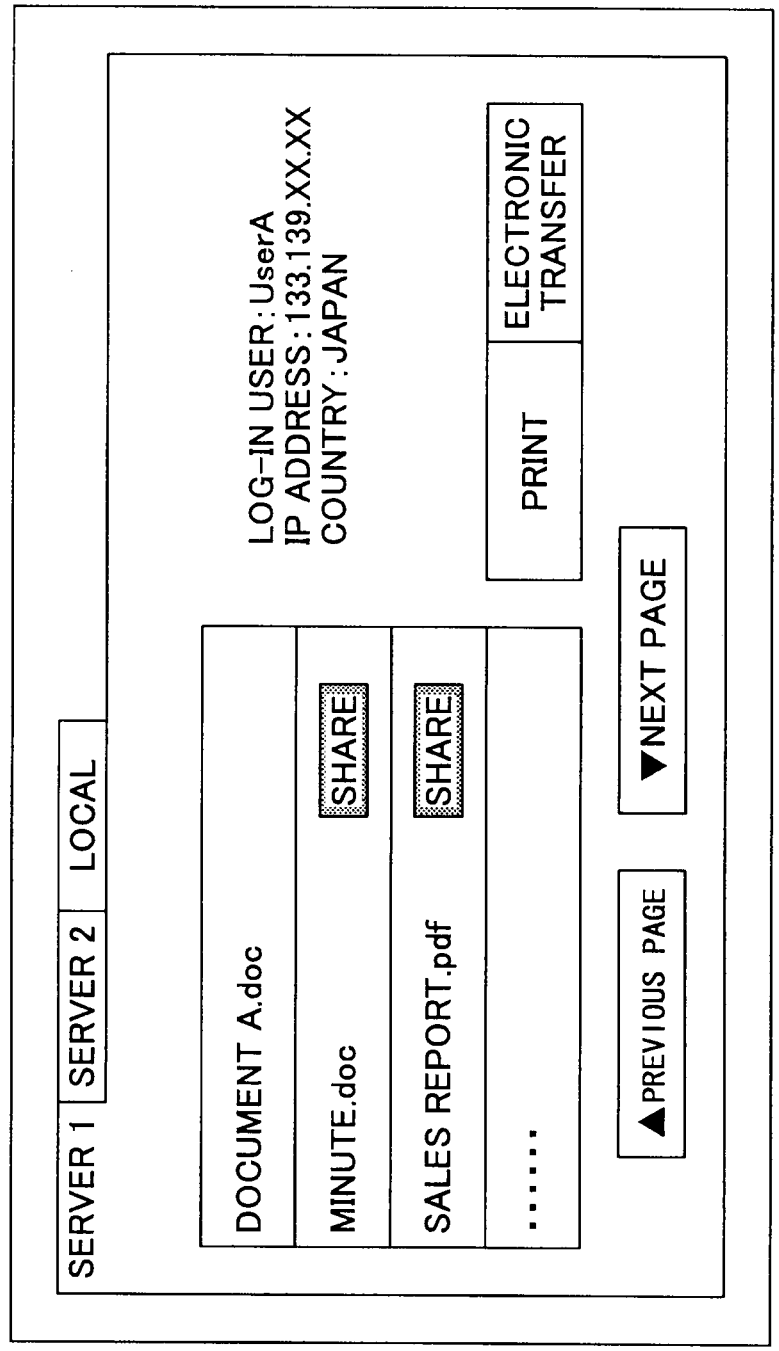
FIG. 8 illustrates a screen image example of a job list according to an embodiment of the present invention.

FIG. 8 illustrates a screen image example of a job list according to the present embodiment.

FIG. 8 indicates a job list screen image W3 of a "User A".

In the job list screen image W3, a job data name corresponding to the User A and share settings of the job data are displayed, based on a job identifier and share control setting information included in the job information in the job list. Additionally, the network setting (IP address) of the image processing apparatus 200 and the installation location (destination) of the image processing apparatus 200 are displayed, based on device information.

Furthermore, in the job list screen image W3, a "print" button and an "electronic transfer" button are displayed. These GUI elements are prepared based on the output format of the job data. These GUI elements are displayed/not displayed based on the output format setting information received together with the job list from the job management apparatus 100 (job list management unit). Specifically, only the GUI element corresponding to the output format allowed to the user is displayed.

Referring back to FIG. 4, the job list display unit 23 receives an instruction to execute a selected job (instruction to output job data) by receiving, via the job list screen image W3, a selected event of a job data name and a pressed event of the "print" button or the "electronic transfer" button.

Furthermore, the job list display unit 23 includes a display possibility determining unit 231 for determining whether to display the job information of a shared job in the job list.

The display possibility determining unit 231 refers to the share location IP address included in the job information of the shared job in the job list, determines whether the value of a network setting of the image processing apparatus 200 is within the range of the share location IP address (network setting range indicating allowable execution environment of shared job), and determines whether the job information can be displayed based on the determination result. The display possibility determining unit 231 determines not to display the job information, when the value of the network setting of the image processing apparatus 200 does not match the setting value of the share location IP address.

Furthermore, the display possibility determining unit 231 refers to the share location country information included in the job information of the shared job in the job list, determines whether the value of the installation location of the image processing apparatus 200 is within the range of the share location range (area setting range indicating allowable execution environment of shared job), and determines whether the job information can be displayed. The display possibility determining unit 231 determines not to display the job information, when the value of the installation location of the image processing apparatus 200 does not match the setting value of the share location country.

Accordingly, the job list display unit 23 displays, in the job list, the job information of a shared job when the value of the network setting of the image processing apparatus 200 matches the setting value of the share location IP address, and the value of the installation location of the image processing apparatus 200 matches the setting value of the share location country.

As described above, in the present embodiment, a shared job is restricted from being displayed in the job list used for selecting a job to be executed, according to allowance conditions set when making the job share setting.

The job control unit 24 is a functional unit for controlling the execution of a specified job. The job control unit 24 outputs job data according to an execution instruction received by the job list display unit 23. The job control unit 24 refers to job information in the job list, and identifies the job for which an execution instruction has been given, based on a job identifier. Then, based on the storage location information of the identified job, the job control unit 24 identifies the job data to be output from among the job data items received together with the job list from the job management apparatus 100 (job list management unit), and outputs the job data.

The job control unit 24 includes an output format determining unit 241 for determining the output format of the job data. The output format determining unit 241 determines the output format based on a pressed event. The output format determining unit 241 identifies the output format specified by the user based on the pressed event, and determines the output format.

Accordingly, the job control unit 24 outputs the job data in the output format based on the determination result of the output format determining unit 241. When the output format is "print", the job control unit 24 refers to the job information of the identified job, makes an operation setting on the plotter 230 based on job attribute information, passes the job data to the plotter 230, and instructs to execute printing. When the output format is "electronic transfer", the job control unit 24 makes a transfer destination setting on the network I/F 213 such as a network setting of the information terminal 300, passes the job data to the network I/F 213, and instructs to execute electronic transfer. When the output format of shared job data is "electronic transfer", the job control unit 24 refers to the job information of the identified shared job, makes a transfer destination setting on the network I/F 213 based on share location address information, passes the job data to the network I/F 213, and instructs to execute electronic transfer. When the method of electronic transfer is e-mail transmission, the job control unit 24 sends, via the network I/F 213, the e-mail data including job data in which the e-mail address of the user is specified.

When the job for which an execution instruction is given is a shared job, the job control unit 24 reports the output result of the shared job data (execution result of shared job) to the job management apparatus 100 (job management unit). The job control unit 24 sends the user identifier of the user who instructed execution and the job identifier of the executed shared job to the job management apparatus 100 (job management unit), and reports the output result.

As described above, in the present embodiment, the job data of a shared job for which an execution instruction has been given is output in the output format specified at the time of job execution.

The job control unit 24 includes a non-display request unit 242 for requesting not to display job information of an output shared job. The non-display request unit 242 refers to the job information of the identified job, and makes a non-display request according to display conditions set in the display control setting information.

Figure 9:
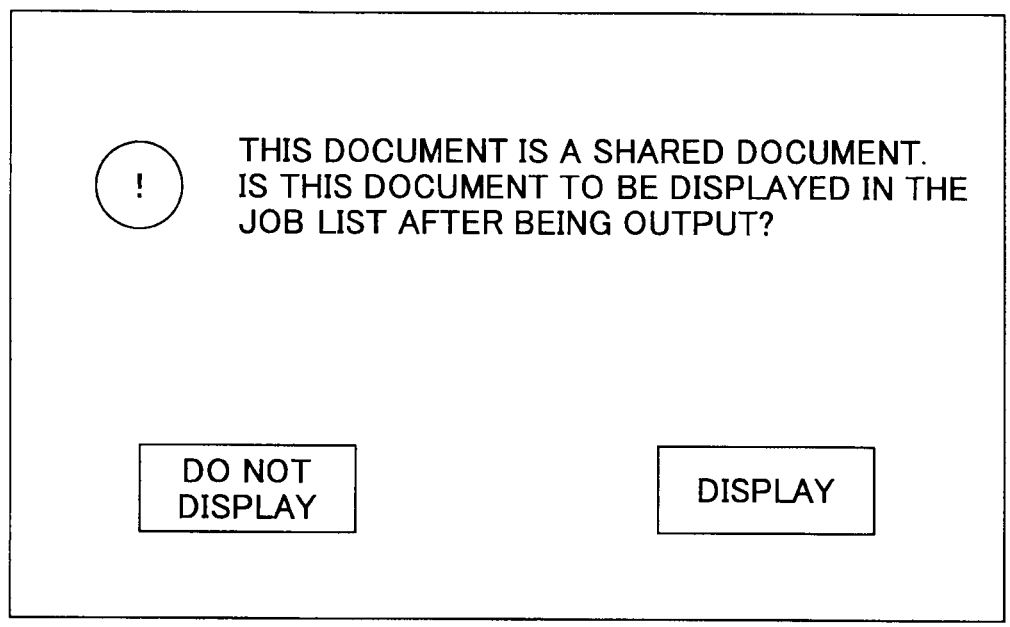
FIG. 9 illustrates a display control screen image example after a job is output according to an embodiment of the present invention.

FIG. 9 illustrates a display control screen image example after a job is output according to the present embodiment.

When "user selection" is set in the display conditions, the non-display request unit 242 displays, to the user, a display control screen image W4 as shown in FIG. 9. Accordingly, the non-display request unit 242 receives an instruction whether to display, in the job list, the job information of the output shared job. When an instruction not to display the job information in the job list is received, the non-display request unit 242 sends the job information to the job management apparatus 100 (job list management unit) according to the received instruction, and requests not to display the job information.

Referring back to FIG. 4, when "automatic non-display" is set in the display conditions, and it is confirmed that output of the shared job has been completed, the non-display request unit 242 sends the job information to the job management apparatus 100 (job list management unit), and requests not to display the job information. As a result, the job information is deleted from the job list of the user, at the job management apparatus 100 (job list management unit).

As described above, the output control function according to the present embodiment is implemented as the above functional units are operated in cooperation with each other. The above functional units are implemented as programs (software implementing the output control function) installed in the respective devices of the output control system 1 are loaded from the storage device (HDD or ROM) to the memory (RAM) by the processer (CPU), and the following process is executed in the respective devices of the output control system 1.

A description is given of detailed operations of the output control function according to the present embodiment, with reference to a flowchart indicating processing procedures.

Main Processes of Output Control

Figure 10:
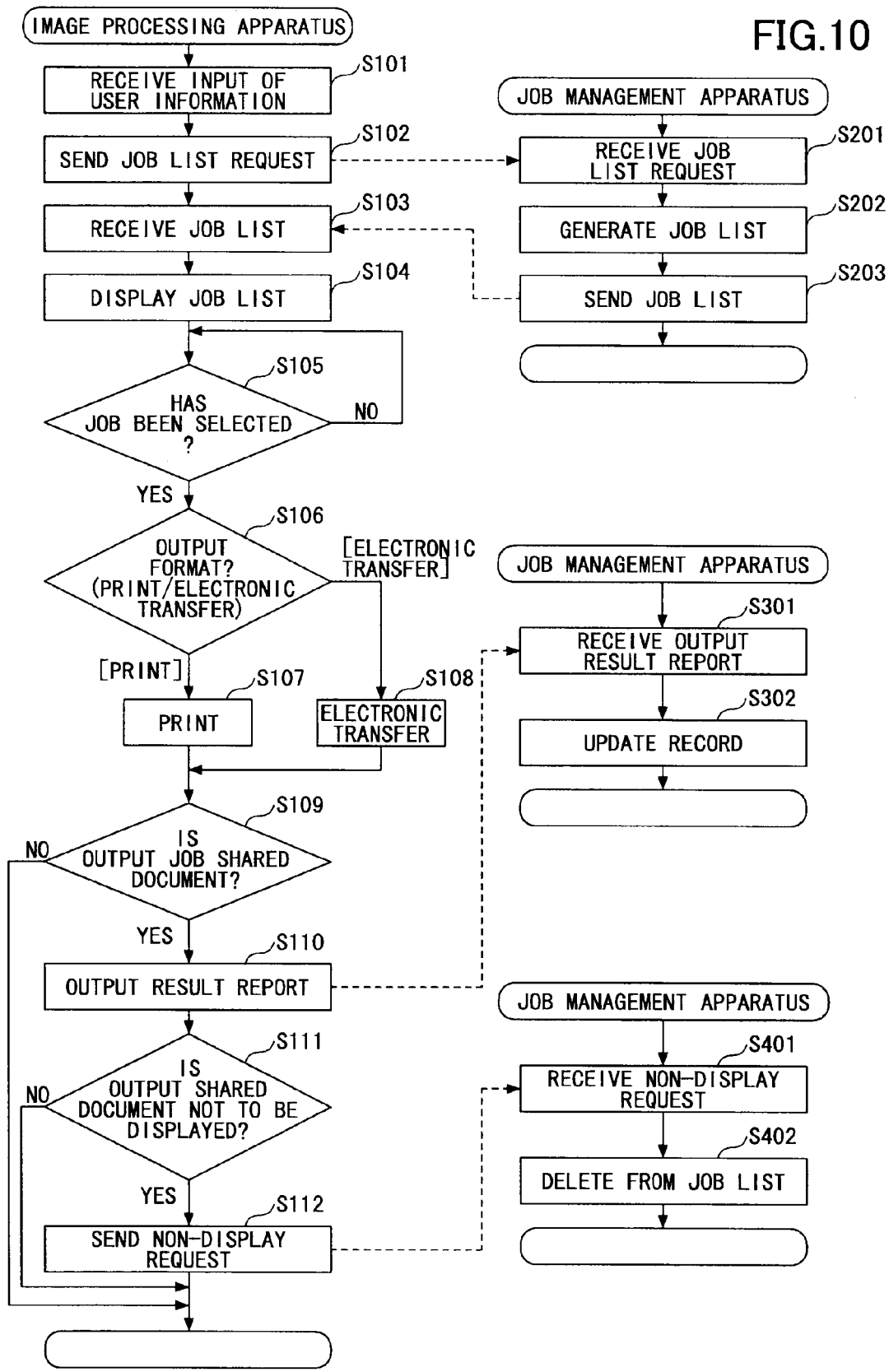
FIG. 10 is a flowchart indicating processing procedures of output control according to an embodiment of the present invention.

FIG. 10 is a flowchart indicating processing procedures of output control according to the present embodiment. The processing procedures described below are based on the assumption that a shared job is already accumulated in the job management apparatus 100, and that a sharing user is outputting the shared job from the image processing apparatus 200. Furthermore, in the following description, as a matter of convenience, a shared job is expressed as a shared document, and shared job data is expressed as shared document data.

As shown in FIG. 10, the image processing apparatus 200 receives, by the user information receiving unit 21, user information input via the operation panel 220 (step S101). At this time, the user information receiving unit 21 receives a user identifier and authentication information as user information.

When the user information is received, the image processing apparatus 200 sends a job list request of the user to the job management apparatus 100 by the job list request unit 22 (step S102). At this time, the job list request unit 22 sends the user identifier received by the user information receiving unit 21 to the job management apparatus 100, and makes a job list request.

When the job list request is received (step S201), the job management apparatus 100 generates a job list by the job list management unit 13 based on job information of the user acquired from the job management unit 12 (step S202), and sends the generated job list to the image processing apparatus 200 that is the request source (step S203). At this time, the job list management unit 13 sends, to the image processing apparatus 200 that is the request source, job data of the user and output format setting information acquired from the job management unit 12 together with the job information, in addition to the job list of the user.

When the job list is received (step S103), the image processing apparatus 200 displays, by the job list display unit 23, the job list screen image W3 on the operation panel 220 based on the received data (step S104).

Next, the image processing apparatus 200 determines, by the job list display unit 23, whether the user has selected a job to be executed on the job list screen image W3 (step S105). At this time, the job list display unit 23 identifies a job specified by the user based on the selected event from the operation panel 220, and performs the above determination process.

When it is determined that the user has selected a job to be executed (YES in step S105), the image processing apparatus 200 determines, by the job control unit 24, the output format (print/electronic transfer) specified during the user instructed job execution (step S106). At this time, the job control unit 24 identifies, by the output format determining unit 241, the output format specified by the user, based on the pressed event from the operation panel 220, to perform the above determination process. The job control unit 24 refers to the job information in the job list, and identifies the selected job based on the job identifier received at the time of job selection from the job list display unit 23, and identifies the job data that is the output target, based on the storage location information of the identified job.

When it is determined that the output format is "print" (PRINT in step S106), the image processing apparatus 200 passes the job data to the plotter 230 by the job control unit 24, and prints the job data (step S107). At this time, the job control unit 24 refers to the job information of the identified job, makes an operation setting on the plotter 230 based on job attribute information, passes the job data to the plotter 230, and instructs to execute printing, to perform the above output process.

When it is determined that the output format is "electronic transfer" (ELECTRONIC TRANSFER in step S106), the image processing apparatus 200 passes the job data to the network I/F 213 by the job control unit 24, and electronically transfers the job data (step S108). At this time, the job control unit 24 refers to the job information of the identified job, makes a transfer destination setting on the network I/F 213 (network setting of information terminal) based on the share location address information, passes the job data to the network I/F 213, and instructs to execute electronic transfer, to perform the above output process.

Accordingly, the user can receive the accumulated job as printed matter or electronic data, according to the format specified at the time of job execution.

Next, the image processing apparatus 200 determines, by the job control unit 24, whether the output job (job for which execution is instructed) is a shared document (shared job) (step S109). At this time, the job control unit 24 refers to the job information of the output job, and performs the above determination process based on share control setting information (job share "YES"/"NO").

When the output job is determined as a shared document (YES in step S109), the image processing apparatus 200 reports, by the job control unit 24, the output result of the shared document (execution result of shared job) to the job management apparatus 100 (step S110). At this time, the job control unit 24 sends the user identifier of the user that output the shared document and the job identifier of the output shared document to the job management apparatus 100, to perform the above report process.

When the output result report of the shared document is received (step S301), the job management apparatus 100 accesses the control information holding unit 92 by the job management unit 12, and updates the corresponding job execution record information in the control information 92D$_2$ based on the received data (step S302). At this time, the job management unit 12 accesses the job management information holding unit 91, refers to the job management information 91D, and identifies the corresponding job information of the shared document based on the job identifier received from the image processing apparatus 200. The job management unit 12 accesses the control information holding unit 92, refers to the control information 92D$_2$ associated with the identified job information, and identifies the corresponding job execution record information ("already output"/"not yet output") corresponding to the user, based on the user identifier received from the image processing apparatus 200. The job management unit 12 updates the identified job execution record information.

Next, the image processing apparatus 200 determines, by the job control unit 24, whether to display, in the job list, the job information of the output shared document (display/not display job information of output shared document) (step S111). At this time, the job control unit 24 refers to the job information of the output shared document included in the job list, and performs the above determination process based on the display control setting information ("user selection"/"automatic non-display").

When display conditions are set in the display control setting information and it is determined not to display the job information in the output shared document (YES in step S111), the image processing apparatus 200 sends, by the job control unit 24, a request to not display the corresponding job information to the job management apparatus 100 (step S112). At this time, the job control unit 24 sends, by the non-display request unit 242, the job information of the output shared document to the job management apparatus 100, according to display conditions set in the display control setting information, and makes a non-display request.

When the non-display request is received (step S401), the job management apparatus 100 deletes, by the job list management unit 13, the job information of the output shared document from the job list of the user, based on received data (step S402). At this time, the job list management unit 13 deletes the job information received from the image processing apparatus 200 from the job list generated at step S202. The job list management unit 13 also deletes the job data (output shared document data) associated with the deleted job information.

When it is determined that the output job is not a shared document (NO in step S109), the image processing apparatus 200 skips the processes of steps S110 through S112, and ends the output control process. Furthermore, when display conditions are not set in the display control setting information and it is determined to display the job information of the output shared document (NO in step S111), the image processing apparatus 200 skips the process of step S112, and the output control process ends.

Display Process of Job List

Figure 11:
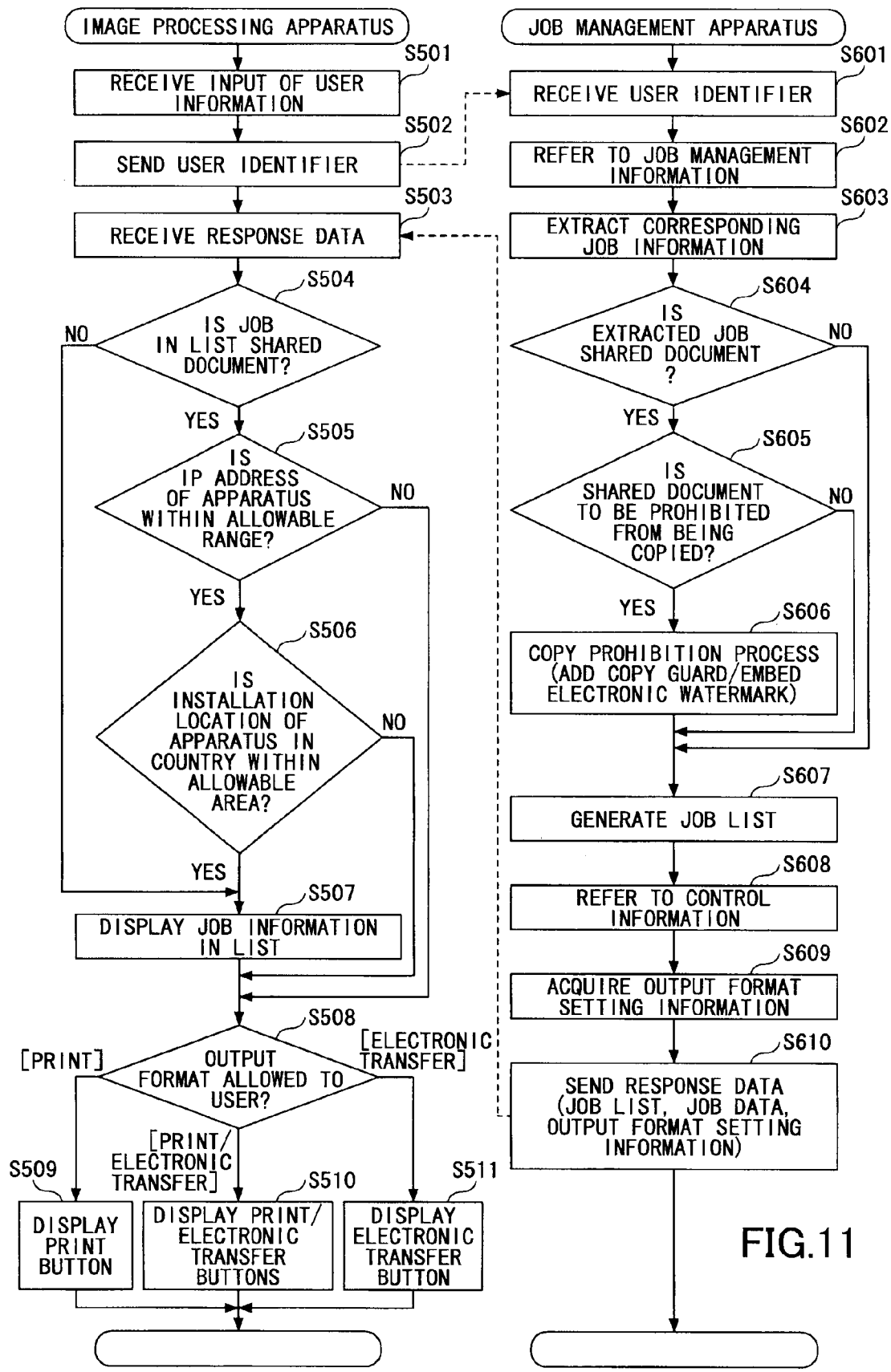
FIG. 11 is a flowchart indicating processing procedures of displaying a job list according to an embodiment of the present invention.

FIG. 11 is a flowchart indicating processing procedures of displaying a job list according to the present embodiment. FIG. 11 indicates the details of steps S101 through S104 executed at the image processing apparatus 200, and details of steps S201 through S203 executed at the job management apparatus 100 in the meantime, in FIG. 10.

As shown in FIG. 11, the image processing apparatus 200 receives, by the user information receiving unit 21, user information input via the operation panel 220 (step S501), and sends a user identifier to the job management apparatus 100 by the job list request unit 22 (step S502). Accordingly, a job list request of the user is made from the image processing apparatus 200 to the job management apparatus 100.

When the job management apparatus 100 receives the user identifier (step S601), the job list management unit 13 performs the following response process to the job list request.

The job list management unit 13 accesses the job management information holding unit 91 and refers to the job management information 91D (step S602), and extracts job information corresponding to the user from the job management information 91D based on the received user identifier (step S603).

The job list management unit 13 determines whether the extracted job is a shared document (shared job), based on the user's job information (step S604).

When the extracted job is determined to be a shared job (YES in step S604), the job list management unit 13 determines whether the shared job is to be prohibited from being copied (step S605). At this time, the job list management unit 13 refers to the job information of the shared document, and performs the above determination process based on copy prohibition setting information (combined settings of "copy guard" and "watermark printing").

When a copy prohibition process is set in the copy prohibition setting information, and when it is determined to prohibit the shared document from being copied (YES in step S605), the job list management unit 13 performs, by the copy prohibition processing unit 131, a copy prohibition process on the shared document data (shared job data) (step S606). At this time, when "copy guard" is set in the copy prohibition setting information, the copy prohibition processing unit 131 performs a process of attaching a program or data for copy guard to the shared document data. When "watermark printing" is set in the copy prohibition setting information, the copy prohibition processing unit 131 performs a process of embedding data of an electronic watermark in the shared document data.

When the extracted job is determined not to be a shared job (NO in step S604), the job list management unit 13 skips the processes of steps S605 and S606. Furthermore, when a copy prohibition process is not set in the copy prohibition setting information, and when it is determined not to prohibit the shared document from being copied (NO in step S605), the job list management unit 13 skips the process of step S606.

Next, the job list management unit 13 generates a job list including the extracted job information (step S607).

Next, the job list management unit 13 accesses the control information holding unit 92, refers to the control information 92D$_1$ in which the allowed output formats for the users are set (step S608), and acquires output format setting information (combined settings of "print" and "electronic transfer") corresponding to the user from the control information 92D$_1$ based on the received user identifier (step S609).

The job list management unit 13 sends, to the image processing apparatus 200, these data items (job list, job data, and output format setting information of user) as response data to the request source (step S610).

When the response data is received from the job management apparatus 100 (step S503), the image processing apparatus 200 performs, by the job list display unit 23, a job list display process as follows.

The job list display unit 23 determines whether the job in the job list is a shared document, based on the received job list (step S504). At this time, the job list display unit 23 refers to the job information in the job list, and performs the above determination process based on share control setting information (share job "YES"/"NO").

When the job in the job list is determined to be a shared document (YES in step S504), the job list display unit 23 determines, by the display possibility determining unit 231, whether the IP address of the image processing apparatus 200 (job execution environment) is within the network setting range indicating the allowable execution environment of the shared document (step S505). At this time, the display possibility determining unit 231 refers to the job information of the shared document, and determines whether the value of the IP address of the image processing apparatus 200 matches the setting value of the share location IP address, based on the share location IP address information.

When the value of the IP address of the image processing apparatus 200 is determined to be within the setting range (YES in step S505), the job list display unit 23 determines, by the display possibility determining unit 231, whether the installation location of the image processing apparatus 200 is within the area setting range indicating the allowable execution environment of the shared document (step S506). At this time, the display possibility determining unit 231 refers to the job information of the shared document, and determines whether the value of the installation location of the image processing apparatus 200 matches the setting value of the share location country, based on the share location country information.

When the value of the installation location of the image processing apparatus 200 is determined to be a country within the setting range (YES in step S506), the job list display unit 23 displays the job information of the shared document in the job list on the operation panel 220 (step S507).

When the job in the job list is determined not to be a shared document (NO in step S504), the job list display unit 23 skips the processes of steps S505 and S506. When the value of the IP address of the image processing apparatus 200 is determined to be outside the setting range (NO in step S505), the job list display unit 23 skips the processes of steps S506 and S507. Accordingly, the job list display unit 23 displays, in the job list, the job information of the non-shared document (document that is not a shared document) in the job list. Furthermore, among the shared documents in the job list, the job list display unit 23 displays only the job information of the shared document satisfying the above determination conditions, in the job list.

Accordingly, at the image processing apparatus 200, the user can only select a shared job satisfying the allowance conditions set when making the job share setting.

Next, the job list display unit 23 determines the output format allowed to the user, based on the received output format setting information (combined settings of "print" and "electronic transfer") (step S508). At this time, when only "print" is set in the output format setting information, the job list display unit 23 determines that only printing is the allowed output format. When only "electronic transfer" is set in the output format setting information, the job list display unit 23 determines that only electronic transfer is the allowed output format. When both "print" and "electronic transfer" are set in the output format setting information, the job list display unit 23 determines that printing and electronic transfer are the allowed output formats.

When it is determined that only printing is the allowed output format (PRINT in step S508), the job list display unit 23 displays, in the job list screen image W3, a "print" button instructing to execute the job selected from the job list (step S509).

When it is determined that printing and electronic transfer are the allowed output formats (PRINT and ELECTRONIC TRANSFER at step S508), the job list display unit 23 displays, in the job list screen image W3, a "print" button and an "electronic transfer" instructing to execute the job selected from the job list (step S510).

When it is determined that only electronic transfer is the allowed output format (ELECTRONIC TRANSFER in step S508), the job list display unit 23 displays, in the job list screen image W3, an "electronic transfer" button instructing to execute the job selected from the job list (step S511).

Process of Deleting Shared Job after Output

FIG. 12 is a flowchart indicating processing procedures of shared job deletion according to the present embodiment. The processing procedures described below are assumed to be executed according to predetermined timings in the job management apparatus 100.

As shown in FIG. 12, the job management apparatus 100 performs the following process of deleting a shared job, by the job management unit 12.

The job management unit 12 accesses the job management information holding unit 91 and refers to the job management information 91D (step S701), and extracts job information corresponding to a shared document (shared job) from the job management information 91D, based on the share control setting information (share job "YES"/"NO") included in the job information (step S702).

The job management unit 12 determines whether deletion conditions are set in the job information of the shared document (step S703). At this time, the job management unit 12 refers to the job information of the shared document, and refers to the above determination process based on deletion control setting information (combined settings of "delete when sharing period passes" and "delete after output by all sharing users").

When it is determined that deletion conditions are set in the deletion control setting information (YES in step S703), the job management unit 12 determines the deletion conditions set in the shared document, based on the deletion control setting information (step S704). At this time, when only "delete when sharing period passes" is set in the deletion control setting information, the job management unit 12 determines that only a determination result of whether the sharing period has passed is the deletion condition. Furthermore, when only "delete after output by all sharing users" is set in the deletion control setting information, the job management unit 12 determines that only a determination result of output by sharing users is the deletion condition. Furthermore, when both "delete when sharing period passes" and "delete after output by all sharing users" are set in the deletion control setting information, the job management unit 12 determines that a determination result of whether the sharing period has passed and a determination result of output by sharing users are the deletion conditions.

When it is determined that only a determination result of whether the sharing period has passed is the deletion condition (PERIOD in step S704), the job management unit 12 determines, by the shared job deletion determining unit 121, whether the present date is within the sharing period (step S705). At this time, the shared job deletion determining unit 121 determines whether the present date is before the expiration date of the sharing period, based on the sharing period information included in the job information of the shared document.

Furthermore, when it is determined that a determination result of whether the sharing period has passed and a determination result of output by sharing users are the deletion conditions (PERIOD/OUTPUT BY USERS at step S704), the job management unit 12 determines, by the shared job deletion determining unit 121, whether the present date is within the sharing period (step S706), and determines whether all sharing users of the shared document have output the job (executed shared job) (step S707). At this time, when it is determined that the present date is within the sharing period (YES in step S706), the shared job deletion determining unit 121 performs the process of step S707. Meanwhile, when it is determined that the present date is not within the sharing period (NO in step S706), the shared job deletion determining unit 121 skips the process of step S707.

Furthermore, when it is determined that a determination result of output by sharing users is the deletion condition (OUTPUT BY USERS at step S704), the job management unit 12 determines, by the shared job deletion determining unit 121, whether all sharing users of the shared document have output the job (step S708). At this time, the shared job deletion determining unit 121 identifies the sharing users of the shared document, based on the share location address information included in the job information of the shared document. Next, the shared job deletion determining unit 121 identifies the control information $92D_2$ associated with the shared document, based on the job identifier included in the job information of the shared document. Accordingly, the shared job deletion determining unit 121 refers to the control information $92D_2$, and determines whether all sharing users have output the shared document data (shared job data), based on the job execution record information of the identified sharing users. A similar process is also performed in step S707.

When it is determined in steps S705 and S706 that the present date is outside the sharing period (NO in steps S705 and S706), the job management unit 12 deletes the job information of the shared document from the job management information 91D (step S709).

When it is determined in steps S707 and S708 that all sharing users of the shared document have output the job (YES in steps S707 and S708), the job management unit 12 performs the process of step S709.

When it is determined in step S705 that the present date is not within the sharing period (NO in step S705), or when it is determined in steps S707 and S708 that all sharing users of the shared document have not output the job (NO in steps S707 and S708), the job management unit 12 skips the process of step S709.

The job management unit 12 determines whether the processes of steps S703 through S709 have been performed on all shared documents in the job management information 91D (step S710), and when it is determined that all shared documents are processed (YES in step S710), the process ends. Meanwhile, when it is determined that all shared documents have not been processed (NO in step S710), the job management unit 12 repeats the processes of steps S703 through S709.

Modification

In the above embodiment, the image processing apparatus 200 includes the user information receiving unit 21, the job list request unit 22, the job list display unit 23, and the job control unit 24, and the job management apparatus 100 includes the job receiving unit 11, the job management unit 12, and the job list management unit 13, and a functional configuration example is described in which these functional units operate in cooperation with each other; however, the present invention is not so limited.

For example, a functional configuration illustrated in FIG. 13 is applicable.

FIG. 13 illustrates a functional configuration example of output control according to the present modification.

In FIG. 13, an image processing apparatus 200b includes the above-described functional units of the job management apparatus 100, in addition to the above-described functional units of the image processing apparatus 200. That is to say, in the image processing apparatus 200b, the above-described functional units of the job management apparatus 100 are incorporated, and therefore the image processing apparatus 200b executes the process of the job management apparatus 100 described with reference to FIGS. 10 and 11, and implements functions such as managing the accumulated jobs and managing the job lists.

In the present modification, according to the above functional configuration, among the plural image processing apparatuses 200a and 200b in the output control system 1, the image processing apparatus 200b can provide, with the incorporated functional units, a job management function to the image processing apparatus 200a.

Overview

As described above, the image processing apparatus 200 according to the present embodiment acquires, by the job list request unit 22, a job list generated based on job information of accumulated jobs including a shared job that is set to be shared by plural users and the job data of the jobs included in the job list. The image processing apparatus 200 displays, by the job list display unit 23, the shared job determined as being allowed to be executed in the present image processing apparatus 200, from among the shared jobs included in the acquired job list, based on the allowance conditions set when making the job share setting. The image processing apparatus 200 outputs (prints/electronically transfers), by the job control unit 24, the job data of the shared job selected to be executed from the displayed job list, according to the output format specified when executing the job.

Accordingly, in the image processing apparatus 200 according to the present embodiment, a shared job is restricted from being displayed in a job list used for selecting a job to be executed, based on allowance conditions set when making the job share setting. Furthermore, the job data of the shared job that is instructed to be executed is output, in the output format specified at the time of job execution.

As described above, the image processing apparatus 200 according to the present embodiment can perform output control of a shared job in consideration of confidentiality of shared information, flexible information providing in versatile user environments, and TCO reduction.

In the above described embodiment, the "output control function" according to the above embodiment is implemented as processors (CPU) provided in the respective devices ("job management apparatus" and "image processing apparatus") included in the output control system 1 execute programs that are coded by a programming language appropriate for the operation environment (platform) to perform the various processing procedures described above with reference to the figures.

In the case of the job management apparatus 100, the above program may be stored in the computer readable recording medium 103a. Accordingly, the above program can be installed in the job management apparatus 100 via the drive device 103. In the case of the image processing apparatus 200, the above program may be stored in the recording medium 214a. Accordingly, the above program can be installed in the image processing apparatus 200 via the external storage I/F 214.

Furthermore, the job management apparatus 100 and the image processing apparatus 200 respectively include the interface device 107 and the network I/F 213, and therefore the above program may be downloaded and installed with the use of an electric communication line.

According to one embodiment of the present invention, an image processing apparatus, an output control system, and an output control method are provided, which are capable of performing output control of shared jobs by restricting displaying shared jobs in the job list from which the job to be executed is selected, according to allowance conditions set when making the job share setting, and outputting the job data of the shared job for which an execution instruction is given in an output format specified at the time of job execution.

According to one embodiment of the present invention, an image processing apparatus is provided, which is capable of implementing output control of shared jobs in consideration of confidentiality of shared information, flexible information providing in versatile user environments, and TCO reduction.

According to one embodiment of the present invention, an output control method is provided, which is capable of providing an environment in which output control of shared jobs is possible.

The present invention is not limited to the specific embodiments described herein, and variations and modifications may be made without departing from the scope of the present invention.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.)

The present application is based on Japanese Priority Patent Application No. 2011-038085, filed on Feb. 24, 2011, the entire contents of which are hereby incorporated herein by reference.

What is claimed is:

1. An apparatus comprising:
a memory or hard disk configured to store accumulated jobs, each accumulated job including job data that is an output object;
a display configured to display a job list of a user, the job list including job information of each accumulated job that is associated with information of the user; and
a job control unit configured to control output of an execution job that is selected from the job list by the user, wherein
the display is configured to display a shared job included in the job list when an allowance condition indicates that the shared job is allowed, and
the job control unit is configured to output job data of the shared job when the shared job is selected as the execution job from the displayed job list in an output format that is selectable by the user from between printing and electronic transferring.

2. The apparatus according to claim 1, further comprising:
a management information memory or hard disk configured to store job management information, the job management information used for managing, in units of the accumulated jobs, the job information of each accumulated job that is associated with share setting information set for the accumulated jobs, wherein
the display is further configured to access the management information memory or hard disk, refer to the job information of the shared job, and display the shared job when the allowance condition indicates that the shared job is allowed.

3. The apparatus according to claim 1, wherein the display is further configured to:
    determine whether a value of a network setting of the apparatus is within a network setting range indicating an allowable execution environment of the shared job satisfying the allowance condition; and
    display the shared job satisfying the allowance condition when the apparatus is determined to be within the network setting range.

4. The apparatus according to claim 1, further comprising:
    a first control information memory or hard disk configured to store first control information in which an output format allowed to a user is set, wherein
    the display is further configured to access the first control information memory or hard disk, and display a display element instructing job execution for each output format based on the output format set in the first control information.

5. The apparatus according to claim 4, wherein the job control unit is further configured to:
    determine the output format specified at the time of job execution based on a pressed event of the display element; and
    print or electronically transfer the job data of the shared job according to the determined output format.

6. The apparatus according to claim 1, further comprising:
    a copy prohibition unit configured to perform, on the job data of the shared job, a copy prohibition process that is set when the shared job is set to be shared, wherein
    the job control unit is further configured to print or electronically transfer the job data of the shared job processed by the copy prohibition unit according to the output format selected by the user.

7. The apparatus according to claim 6, further comprising:
    a management information memory or hard disk configured to store job management information, the job management information used for managing, in units of the accumulated jobs, the job information of each accumulated job that is associated with share setting information set for the accumulated jobs, wherein
    the copy prohibition unit is further configured to:
        access the management information memory or hard disk,
        refer to the job information of the shared job, and
        attach a program or data for copy guard to the job data of the shared job based on a copy guard specification set in the share setting information, or embed data of an electronic watermark in the job data of the shared job based on a watermark printing specification set in the share setting information.

8. The apparatus according to claim 1, further comprising:
    a management information memory or hard disk configured to store job management information, the job management information used for managing, in units of the accumulated jobs, the job information of each accumulated job that is associated with share setting information set for the accumulated jobs; and
    a job deleting unit configured to, after job execution, access the management information memory or hard disk, refer to the job information of the shared job, and delete the shared job including the job information and the job data of the shared job based on a deletion condition set in the share setting information.

9. The apparatus according to claim 8, further comprising:
    a second control information memory or hard disk configured to store second control information including job execution statuses of users of the shared job, wherein
    the job deleting unit is further configured to access the second control information memory or hard disk, determine whether all users of the shared job have completed job execution based on the job execution statuses in the second control information, and delete the job information and the job data of the shared job when all users of the shared job have completed job execution.

10. The apparatus according to claim 1, wherein the display is further configured to display output formats for selection by the user.

11. An output control system comprising:
    a job management apparatus configured to store accumulated jobs, each accumulated job including job data that is an output object, in a memory or hard disk and manage the accumulated jobs; and
    an apparatus configured to output a shared job among the accumulated jobs that is set to be shared by plural users, wherein
    the job management apparatus and the apparatus are connected by a predetermined data transmission line,
    the job management apparatus includes:
        a job list management unit configured to manage a job list of a user, the job list including job information of each accumulated job that is associated with information of the user,
    the apparatus includes:
        a display configured to display the job list; and
        a job control unit configured to control output of an execution job that is selected from the job list by the user,
    the job management apparatus is configured to send to the apparatus the job list managed by the job list management unit and job data of the accumulated jobs included in the job list, in response to the acquisition request from the apparatus, and
    the apparatus is configured to:
    display, by the display, a shared job that is included in the job list received from the job management apparatus when an allowance condition indicates that the shared job is allowed, and
    output, by the job control unit, job data of the shared job when the shared job is selected as the execution job from the displayed job list among the job data received from the job management apparatus in an output format that is selectable by the user from between printing or electronic transferring.

12. An output control method performed by an apparatus, the output control method comprising the steps of:
    storing accumulated jobs in a memory or hard disk, each accumulated job including job data that is an output object;
    displaying, on a display device, a job list of a user, the job list including job information of each accumulated job that is associated with information of the user; and
    controlling output of an execution job that is selected by the user from the job list displayed by the display device, wherein
    the displaying includes displaying a shared job included in the job list when an allowance condition indicates that the shared job is allowed, and
    the controlling output includes outputting job data of the shared job when the shared job is selected as the execution job from the displayed job list in an output format that is selectable by the user from between printing and electronic transferring.

* * * * *